(12) United States Patent
Chang

(10) Patent No.: US 8,204,484 B2
(45) Date of Patent: Jun. 19, 2012

(54) SYSTEM AND METHOD FOR MANAGING MISSED CALLS AND UNREAD MESSAGES

(75) Inventor: Ching-Wei Chang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 643 days.

(21) Appl. No.: 12/338,958

(22) Filed: Dec. 18, 2008

(65) Prior Publication Data

US 2009/0318118 A1  Dec. 24, 2009

(30) Foreign Application Priority Data

Jun. 20, 2008 (CN) .......................... 2008 1 0302246

(51) Int. Cl.
- H04M 1/725 (2006.01)
- H04M 3/00 (2006.01)
- H04M 3/42 (2006.01)
- H04M 11/10 (2006.01)
- H04M 1/64 (2006.01)
- G08B 23/00 (2006.01)

(52) U.S. Cl. ...................... 455/412.2; 455/419; 455/415; 455/413; 379/88.12; 379/88.11; 340/500

(58) Field of Classification Search ................. 455/412.2
See application file for complete search history.

(56) References Cited

U.S. PATENT DOCUMENTS

| | | | |
|---|---|---|---|
| 2007/0190995 A1* | 8/2007 | Wang et al. | 455/419 |
| 2008/0057926 A1* | 3/2008 | Forstall et al. | 455/415 |
| 2010/0159889 A1* | 6/2010 | Sigmund et al. | 455/413 |

FOREIGN PATENT DOCUMENTS

CN  1929665 A  3/2007

* cited by examiner

Primary Examiner — Dwayne Bost
Assistant Examiner — Timothy Pham
(74) Attorney, Agent, or Firm — Altis Law Group, Inc.

(57) ABSTRACT

A method and system for reporting missed calls and unread messages include setting a report function in a predetermined communication device, determining if the predetermined communication device receives a short message, which is substantially the same as a preset short message service (SMS) command. The method and the system further include invoking the report function to send unread short message and a list of missed calls of the predetermined communication device if the predetermined communication device receives a short message being substantially the same as the preset SMS command.

13 Claims, 4 Drawing Sheets

SYSTEM AND METHOD FOR MANAGING MISSED CALLS AND UNREAD MESSAGES

BACKGROUND

1. Field of the Invention

Embodiments of the present disclosure relate to information management systems and methods, and more particularly to a system and method for managing missed calls and unread messages.

2. Description of Related Art

With rapid development of communication, portable electronic devices, such as mobile phones are now in widespread use. Now, the mobile phones are the major means of communication in business, industry, government and social intercourse. The mobile phones provide various functionalities for people, such as short message services, communications, games, calendars, music, etc. More and more people utilize mobile phones to communicate with others, transmit data with others, and record personal information, etc. However, when people forget to bring their mobile phones with themselves, incoming calls or short messages may not be timely received.

What is needed, therefore, is a system and method for overcoming the above-mention problem.

DETAILED DESCRIPTION OF CERTAIN INVENTIVE EMBODIMENTS

All of the processes described below may be embodied in, and fully automated via, software code modules executed by one or more general purpose computers or processors. The code modules may be stored in any type of non-transitory computer-readable medium or other non-transitory storage device. Some or all of the methods may alternatively be embodied in specialized computer hardware or communication apparatus.

Figure 1:
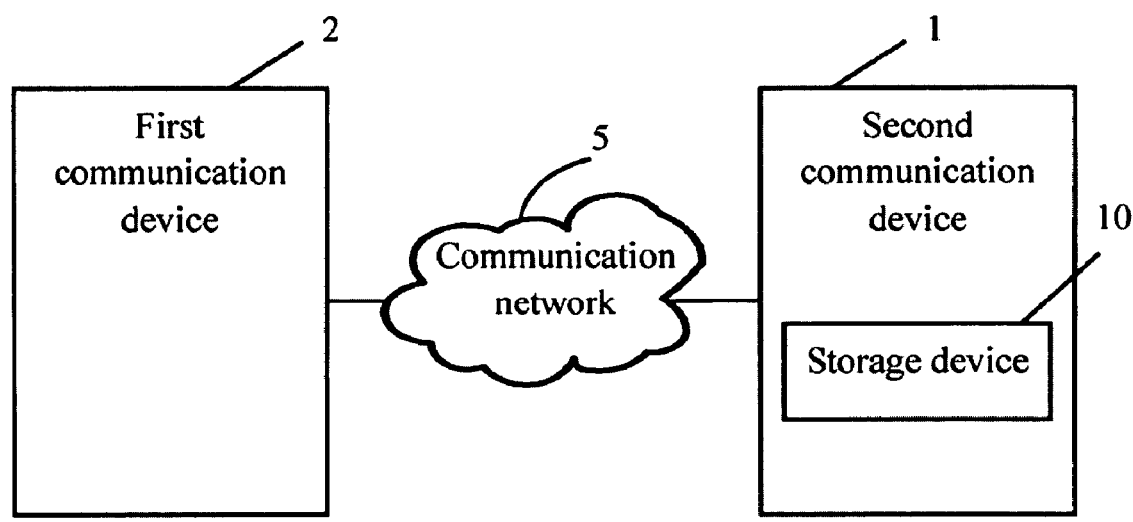
FIG. 1 is a block diagram of one embodiment of a system for managing missed calls and unread messages of a first communication device.

FIG. 1 is a block diagram of one embodiment of a system for managing missed calls and unread messages (hereinafter referred to as "the managing system") of a first communication device 2. To better detail the embodiment, a communication device, which is initiated to receive information of missed calls and unread messages of a predetermined communication device, will be described as a second communication device 1, and the predetermined communication device will be described as the first communication device 2.

Depending on the embodiment, the managing system may include the first communication device 2 and a second communication device 1. The first communication device 2 may communicate with the second communication device 1 through a communication network 5. Depending on the embodiment, the communication network 5 may be the Global System for Mobile communication (GSM) network, the General Packet Radio Service (GPRS) network, or the Internet, for example.

The managing system is configured for sending/forwarding the information of the missed calls and the unread messages of the first communication device 2 according to a request received from the second communication device 1. For example, if the first communication device 2 is forgotten at home, a user may use the second communication device 1 to send a request to the first communication device 2 to acquire information of the missed calls and the unread messages.

Figure 2:
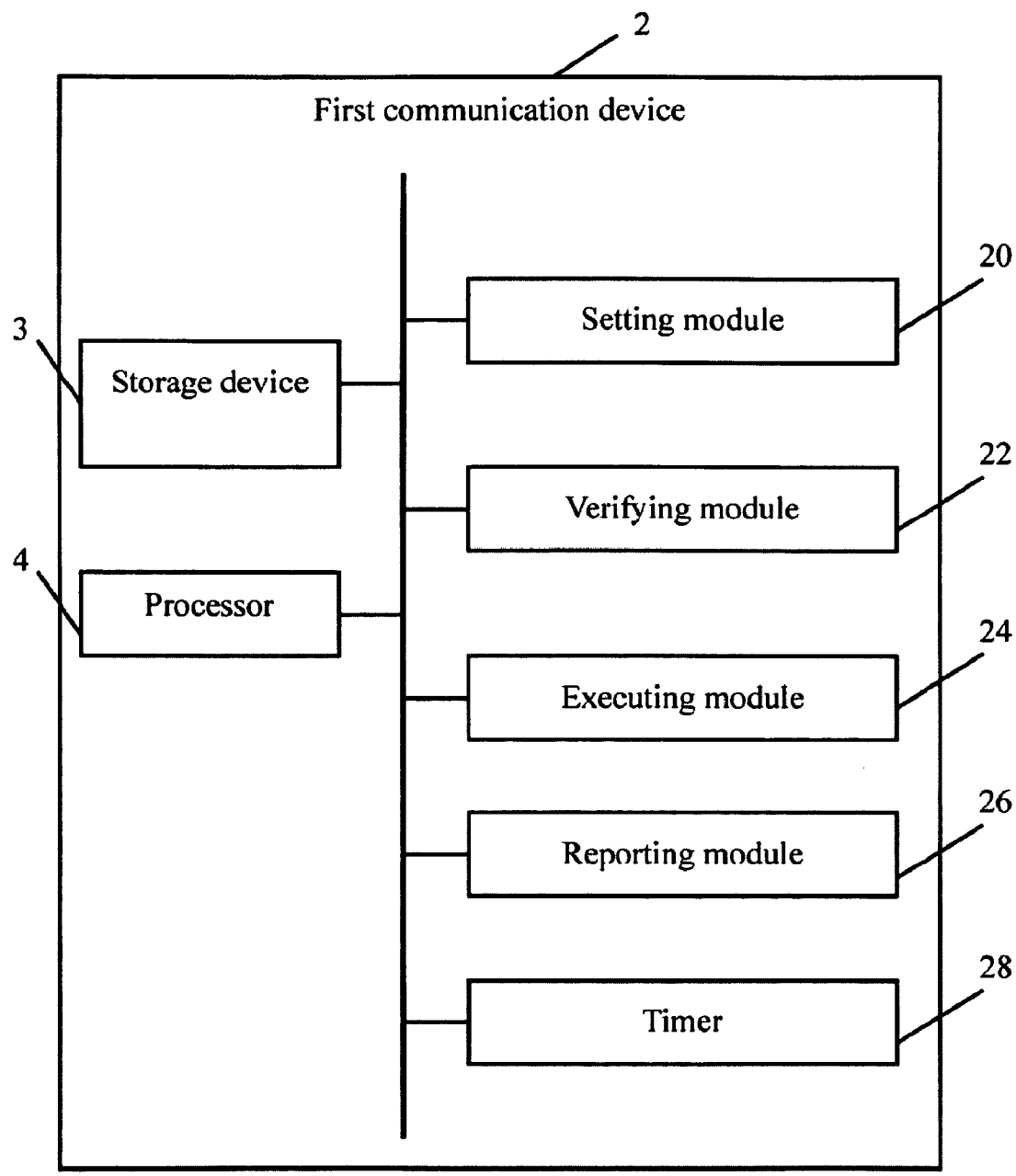
FIG. 2 is a block diagram of one embodiment of the first communication device.

FIG. 2 is a block diagram of one embodiment of the first communication device 2. The managing system includes a storage device 3 and at least one processor 4. The storage device 3 is used for storing various kinds of data, such as short messages, communication records, etc. Depending on the embodiment, the storage device 3 may include a memory of the first communication device 2 or an external storing card, such as a memory stick, a Subscriber Identity Module (SIM) card, for example.

In one embodiment, the managing system may include a setting module 20, a verifying module 22, an executing module 24, a reporting module 26, and a timer 28. The modules 20, 22, 24, and 26 may be used to perform one or more operations for the managing system. In another embodiment, the managing system may include one or more specialized or general purpose processors, such as the at least one processor 4 for executing at least one operation for the modules 20, 22, 24, and 26.

The setting module 20 is configured for setting a report function for reporting the missed calls and the unread messages of the first communication device 2 to the second communication device 1, and setting a short message service (SMS) command for invoking or terminating the report function. In the embodiment of the present disclosure, the SMS command may include a password, an enable forward code/a disable forward code, and receiver information. The password is an identification code of the SMS command. The enable forward code is configured for invoking the report function, and the disable forward code is configured for terminating the report function.

The receiver information may include a phone number of the second communication device 1 or an E-mail address of the user. In the embodiment of the present disclosure, the receiver information is the phone number of the second communication device 1.

The setting module 20 is further configured for setting a format of the SMS command. In one embodiment, the format of the SMS command may be "enable forward code/password/phone number" or "an enable forward code/password/Email address." Sequences of the enable forward code/the disable forward code, the password and the receiver information may be changed.

The verifying module 22 is configured for verifying if a received short message from the second communication device 1 is substantially the same as the set SMS command by determining if the received short message comprises the password, the enable forward code or the disable forward code, and prompting that the first communication device 2 receives a new short message if the received short message is different from the set SMS command. The verifying module 22 is further configured for determining if the received short message includes the enable forward code or the disable forward code.

The executing module 24 is configured for invoking the report function if the received short message includes the enable forward code, or terminating the report function if the received short message includes the disable forward code.

The reporting module 26 is configured for sending the unread messages of the first communication device 2 to the second communication device 1 according to the receiver information, and/or generating a report list of the missed calls of the first communication device 2 and sending the report list to the second communication device 1. The report list includes phone numbers, caller names, and call times of the missed calls of the first communication device 2.

In another embodiment, the SMS command may further include a time interval. The time interval is configured to control the reporting module 26 to report the unread messages and the report list to the second communication device 1 period periodically. For example, the format of the SMS command may be set as "enable forward code/password/phone number/time interval," such as "start/***/123456/30 minutes."

The timer 28 is configured for timing when the first communication device 2 receives the SMS command including the time interval. The reporting module 26 is further configured for generating a report list of the missed calls received during the time interval, and sending the report list and the unread messages received during the time interval to the second communication device 1 once the time interval is reached. In one embodiment, the time interval is set as "30 minutes," then the reporting module 26 sends the unread messages and the report list to the second communication device 1 every 30 minutes.

FIG. 2 is a flowchart of one embodiment of a method for managing missed calls and unread messages. Depending on the embodiment, additional blocks may be added, others removed, and the ordering of the blocks may be changed.

In block S2, the setting module 20 sets a report function for reporting missed calls and unread messages of the first communication device 2 to the second communication device 1.

In block S4, the setting module 20 sets a SMS command for invoking or terminating the report function. The SMS command may include a password, an enable forward code/a disable forward code, and receiver information. The password is an identification code of the SMS command. The enable forward code is configured for invoking the report function, and the disable forward code is configured for terminating the report function. The receiver information may be a phone number of the second communication device 1 or an E-mail address of the user.

In block S6, the first communication device 2 receives a short message from the second communication device 1. In block S8, the verifying module 22 determines if the received short message is substantially the same as the set SMS command by determining if the received short message comprises the password, the enable forward code or the disable forward code. If the received short message is different from the set SMS command, in block S18, the verifying module 22 prompts that the first communication device 2 receives a new short message.

If the received short message is substantially the same as the set SMS command, in block S10, the verifying module 22 determines if the received short message includes the enable forward code or the disable forward code.

If the received short message includes the enable forward code, in block S12, the executing module 24 invokes the report function. Otherwise, if the received short message includes the disable forward code, in block S16, the executing module 24 terminates the report function.

In block S14, the reporting module 26 sends/forwards the unread messages of the first communication device 2 to the second communication device 1 according to the receiver information, and/or generates a report list of the missed calls of the first communication device 2 and sends the report list to the second communication device 1. The report list includes phone numbers, caller names, and call times of the missed calls of the first communication device 2.

Figure 3:
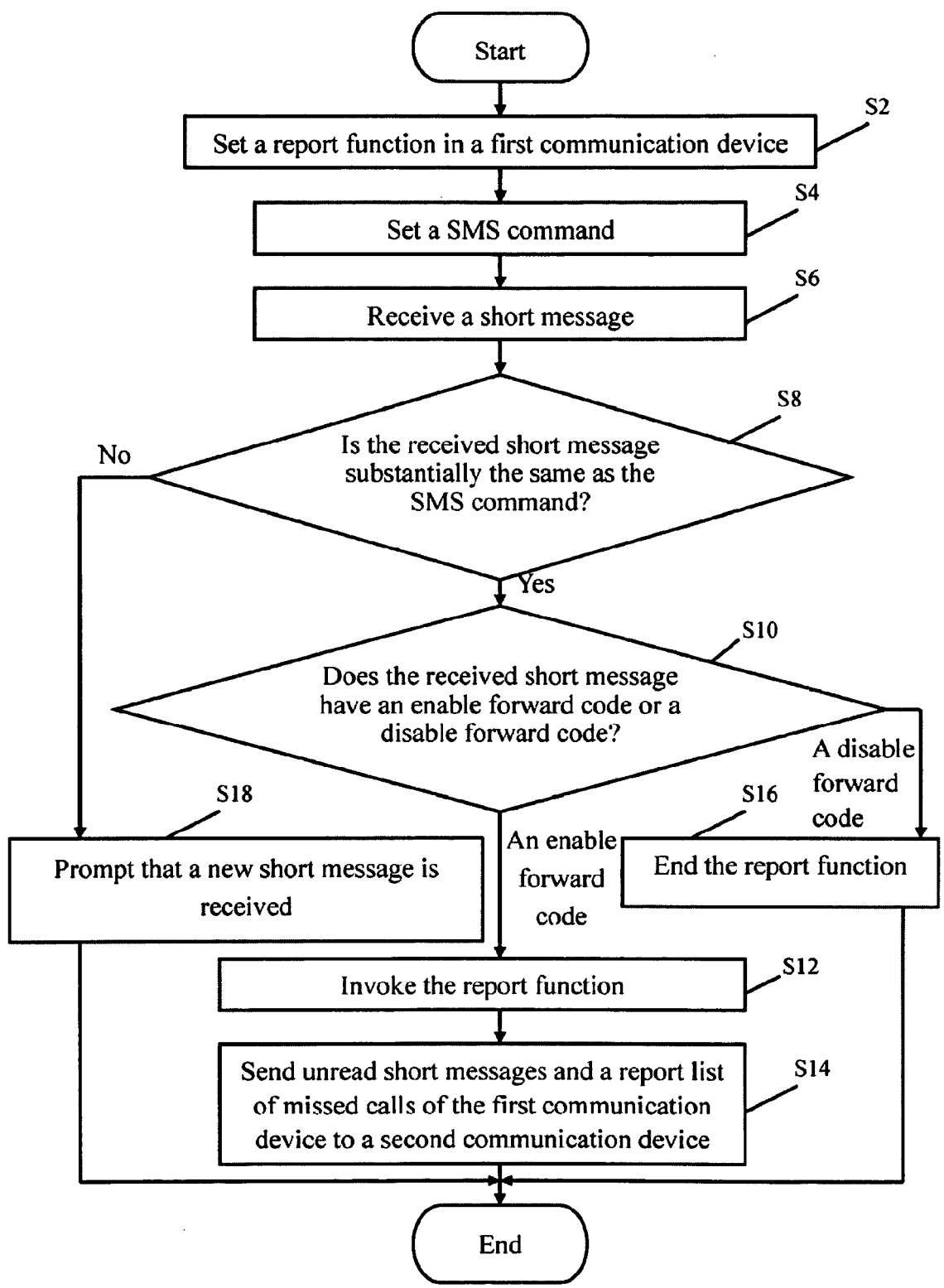
FIG. 3 is a flowchart of one embodiment of a method for managing missed calls and unread messages.
Figure 4:
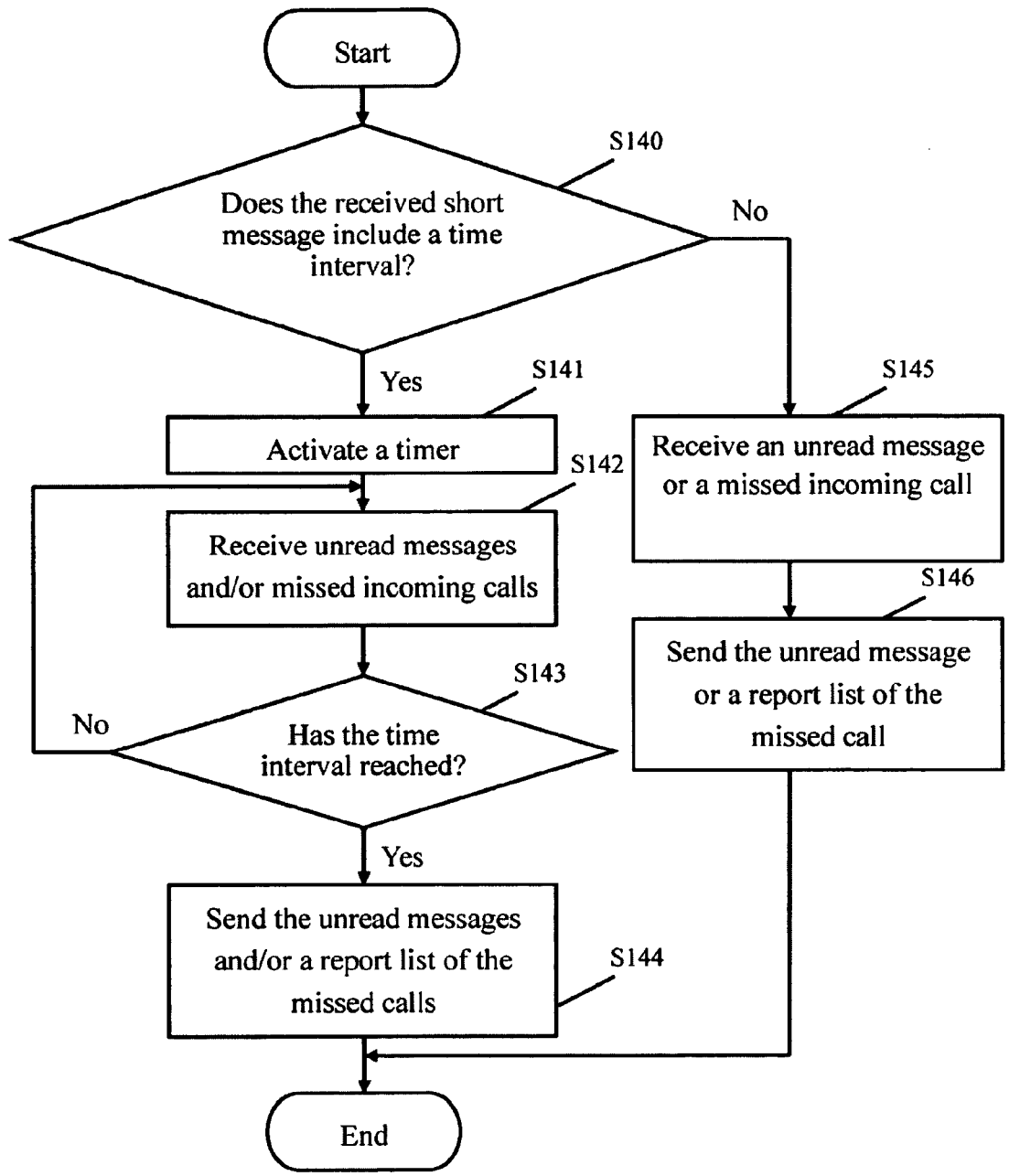
FIG. 4 is a flowchart of block S14 of FIG. 2 in detail.

FIG. 3 is a flowchart of block S14 of FIG. 2 in detail. Depending on the embodiment, additional blocks may be added, others removed, and the ordering of the blocks may be changed.

In block S140, the verifying module 22 determines if the received short message includes a time interval. If the received short message includes a time interval, in block S141, the timer 28 of the first communication device 2 is activated. In block S142, the first communication device 2 receives unread messages and/or missed calls from the second communication device 1.

In block S143, the timer 28 determines if the time interval has been reached. If the time interval has been reached, in block S144, the reporting module 26 generates a report list of the missed calls received during the time interval, and sends the report list and/or the unread messages received during the time interval to the second communication device 1. If the time interval has not been reached, the procedure returns to block S142.

If the received short message does not include a time interval, in block S145, the first communication device 2 receives an unread short message or a missed incoming call from the second communication device 1. In block S146, the reporting module 26 generates a report list of the missed incoming call and sends the report list or the unread messages to the second communication device 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for reporting missed calls and unread messages, the system comprising a first communication device in communication with a second communication device via a communication network, the first communication device comprising:

a setting module configured to set a report function for reporting missed calls and unread messages of the first communication device to the second communication device via the communication network, and set a short message service (SMS) command comprising a password, an enable forward code, a disable forward code, and receiver information of the second communication device, the enable forward code being configured for invoking the report function, the disable forward code being configured for terminating the report function;

a verifying module configured to verify whether a received short message from the second communication device is substantially the same as the SMS command by determining whether the received short message comprises the password, the enable forward code or the disable forward code, and determining whether the received short message comprises the enable forward code or the disable forward code when the received short message is substantially the same as the SMS command;

an executing module configured to invoke the report function when the received short message comprises the enable forward code;

a reporting module configured to send the unread messages of the first communication device to the second communication device according to the receiver information, and/or generate a report list of missed calls of the first communication device and sending the report list to the second communication device;

a timer configured to time when the first communication device receives the SMS command comprising a time interval that controls the reporting module to report the unread messages and the report list to the second communication device periodically;

a non-transitory storage device that stores the setting module, the verifying module, the executing module, and the reporting module; and at least one processor that executes the setting module, the verifying module, the executing module, and the reporting module.

2. The system according to claim 1, wherein the executing module is further configured for terminating the report function if the received short message comprises the disable forward code.

3. The system according to claim 1, wherein the setting module is further configured for setting a format of the SMS command.

4. The system according to claim 1, wherein the reporting module is further configured to send the unread messages and the report list of the missed calls of the first communication device to the second communication device once the time interval is reached.

5. The system according to claim 1, wherein the report list comprises phone numbers, caller names, and call times of the missed calls.

6. A computer-implemented method for reporting missed calls and unread messages, the method in form of a computer program recorded in a non-transitory storage device, the method comprising:

setting a report function for reporting missed calls and unread messages of a first communication device to a second communication device, and setting a short message service (SMS) command comprising a password, an enable forward code, a disable forward code, and receiver information of the second communication device, the enable forward code being configured for invoking the report function, the disable forward code being configured for terminating the report function;

verifying whether a received short message from the second communication device is substantially the same as the SMS command by determining whether the received short message comprises the password, the enable forward code or the disable forward code;

determining whether the received short message comprises the enable forward code or the disable forward code whether the received short message is substantially the same as the SMS command;

invoking the report function when the received short message comprises the enable forward code;

sending the unread messages of the first communication device to the second communication device according to the receiver information; and generating a report list of missed calls of the first communication device and sending the report list to the second communication device;

wherein the SMS command further comprises a time interval for controlling the unread messages and the report list to be reported to the second communication device periodically;

7. The method according to claim 6, further comprising:
terminating the report function if the received short message comprises the disable forward code.

8. The method according to claim 6, further comprising:
setting a format of the SMS command.

9. The method according to claim 6, wherein the report list comprises phone numbers, caller names, and call times of the missed calls.

10. A non-transitory storage medium having stored thereon instructions that, when executed by a processor, causing the processor to perform a method for reporting missed calls and unread messages, the method comprising:

setting a report function for reporting missed calls and unread messages of a first communication device to a second communication device, and setting a short message service (SMS) command comprising a password, an enable forward code, a disable forward code, and receiver information of the second communication device, the enable forward code being configured for invoking the report function, the disable forward code being configured for terminating the report function;

verifying whether a received short message from the second communication device is substantially the same as the SMS command by determining whether the received short message comprises the password, the enable forward code or the disable forward code;

determining whether the received short message comprises the enable forward code or the disable forward code whether the received short message is substantially the same as the SMS command;

invoking the report function when the received short message comprises the enable forward code;

sending the unread messages of the first communication device to the second communication device according to the receiver information; and generating a report list of missed calls of the first communication device and sending the report list to the second communication device;

wherein the SMS command further comprises a time interval configured for controlling the unread messages and the report list to be reported to the second communication device periodically.

11. The medium according to claim 10, wherein the method further comprises:

determining if the received short message comprises the disable forward code; and terminating the report function if the received short message comprises the disable forward code.

12. The medium according to claim 10, wherein the method further comprises:

setting a format of the SMS command.

13. The medium according to claim 10, wherein the report list comprises phone numbers, caller names, and call times of the missed calls.

* * * * *